July 21, 1942.   H. M. ULLSTRAND   2,290,509
REFRIGERATION
Filed April 7, 1938
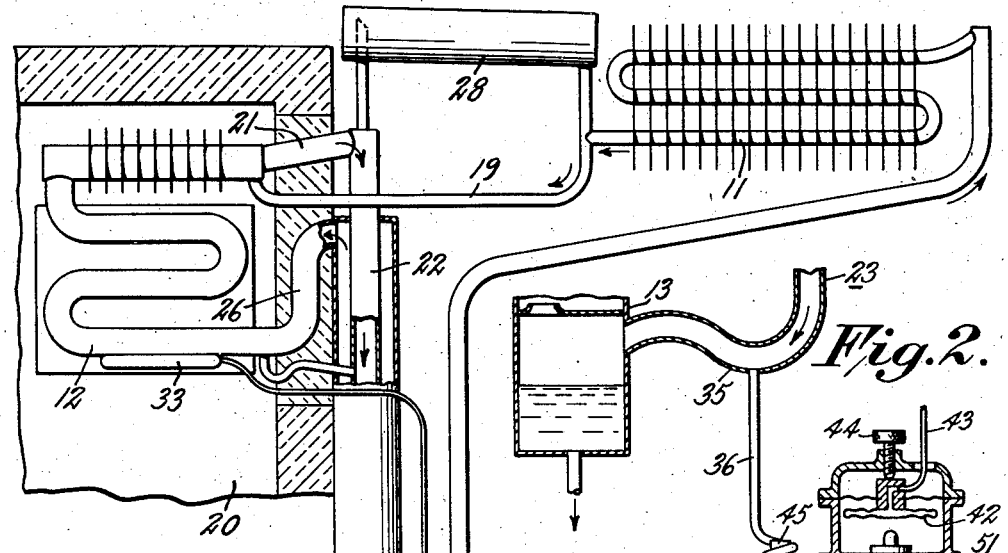
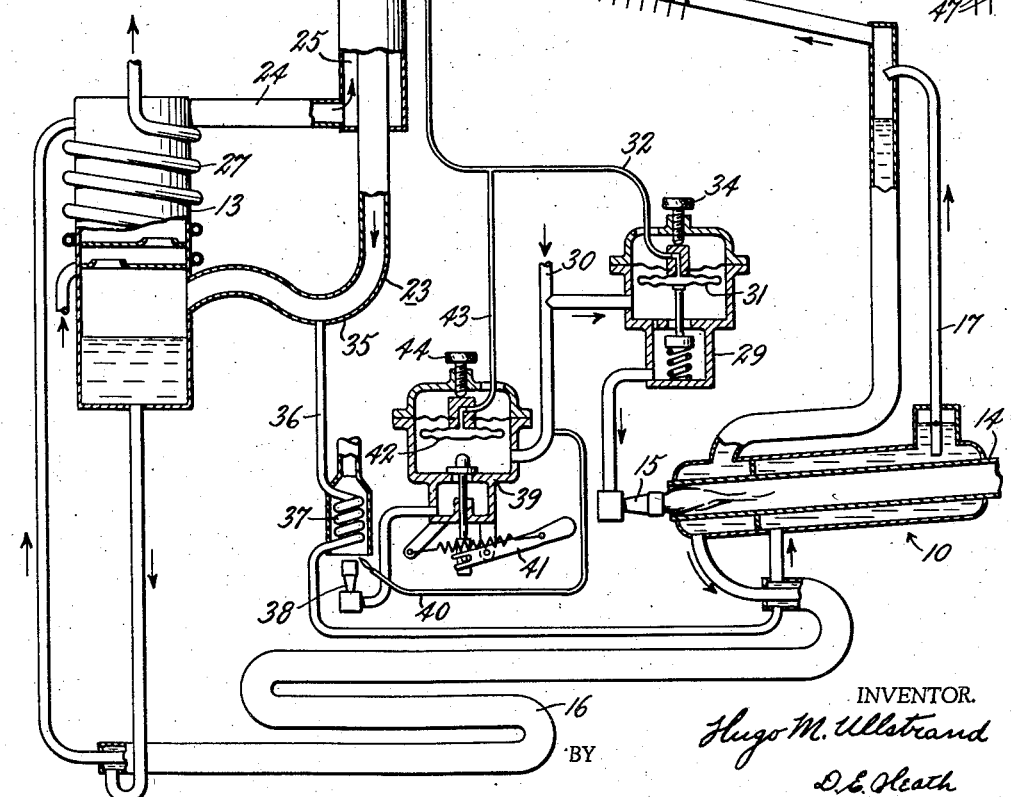
INVENTOR.
Hugo M. Ullstrand
BY
D. E. Heath
his ATTORNEY.

Patented July 21, 1942

2,290,509

UNITED STATES PATENT OFFICE 2,290,509

REFRIGERATION

Hugo M. Ullstrand, Evansville, Ind., assignor to Servel, Inc., New York, N. Y., a corporation of Delaware Application April 7, 1938, Serial No. 200,569

10 Claims. (Cl. 62—5)

My invention relates to refrigeration and more particularly to removal of frost from the cooling surface of a refrigerator utilizing evaporation of refrigerant fluid in the presence of auxiliary fluid.

It is an object of the invention to remove frost quickly. It is another object to provide a self-stopping method and apparatus for frost removal.

I evaporate liquid refrigerant in the presence of auxiliary fluid to produce low temperature at a cooling surface and quickly raise the temperature of the cooling surface to melt frost thereon by stopping the flow of gaseous fluid with trapped liquid, and release the liquid upon predetermined increase in temperature of the cooling surface, as more fully set forth in the following description in connection with the accompanying drawing, of which:

Fig. 1 shows more or less diagrammatically a refrigeration system embodying the invention; and Fig. 2 is a fragmentary view illustrating a modification.

Referring to Fig. 1, the refrigeration system includes a generator 10, a condenser 11, an evaporator 12, and an absorber 13. The generator 10 is provided with a flue 14 and is heated by a gas burner 15 arranged so that the flame is projected into the lower end of the flue. The generator 10 and absorber 13 are interconnected by members including a liquid heat exchanger 16 for circulation of absorption liquid therethrough and therebetween. Circulation of the absorption liquid is caused by a thermosyphon or vapor lift conduit 17.

The generator 10 is connected by a conduit 18 for delivery of vapor to the condenser 11. The condenser is connected by a conduit 19 to the evaporator 12 for flow of liquid from the condenser to the evaporator. The evaporator 12 is located in the upper part of a refrigerator storage compartment 20. The evaporator 12 and absorber 13 are interconnected for circulation of gas therethrough and therebetween. The upper end of evaporator 12 is connected by a conduit 21, inner passage 22 of a gas heat exchanger, and conduit 23 to the lower part of absorber 13. The upper part of the absorber is connected by a conduit 24, an outer passage 25 of the gas heat exchanger and a conduit 26 to the lower end of the evaporator coil 12.

The absorber 13 is provided with a cooling coil 27 which, for instance, may be connected to a condenser, not shown, forming therewith a vaporization-condensation circuit for cooling of the absorber. The absorber may be direct air cooled.

The lower end of condenser 11 is connected to the gas heat exchanger by conduits including a gas accumulation vessel 28.

The system contains refrigerant fluid, a liquid absorbent therefor, and an auxiliary inert gas. These fluids may be, for instance, ammonia, water, and hydrogen, respectively. Ammonia vapor is expelled from solution by heating in the generator 10. Ammonia vapor is condensed to liquid in the condenser 11. Liquid ammonia evaporates and diffuses into hydrogen in the evaporator 12, producing a refrigerating effect. Ammonia vapor is absorbed out of the gas into solution in the absorber 13. Circulation of gas in the evaporator-absorber circuit is caused by difference in specific weights of gas flowing from the upper part of absorber 13 to the lower part of evaporator 12 and the heavier gas flowing from the upper part of evaporator 12 to the lower part of the absorber.

The generator heating burner 15 is automatically controlled responsive to temperature of the evaporator 12 by a valve 29 which controls flow of gas to the burner 15 from a gas line 30. The valve 29 is operated by an expansible fluid thermostat which includes an expansible diaphragm 31 connected by a capillary tube 32 to a sensitive bulb or element 33 located in contact with the lower part of the evaporator 12. The thermostat is adjustable by a screw 34 so that the burner 15 operates to maintain the evaporator 12 at a desired temperature.

When the system is operated so that the evaporator 12 is at a temperature below the freezing point of water, as is necessary to produce ice freezing, frost forms on the surfaces of the evaporator due to condensation of water vapor from air flowing in contact with these surfaces, and freezing of the condensate. It is desirable to remove this frost at intervals on account of its thermal insulating property and also for sanitary reasons.

In the evaporator 12, liquid refrigerant evaporates at temperatures corresponding to the partial pressure of its vapor. By stopping circulation of gas in the absorber-evaporator circuit, vaporous refrigerant fluid is not carried out of the evaporator and its partial pressure increases and the temperature rises. When it is desired to remove frost from the evaporator 12, I do this quickly by stopping the gas circulation. Conduit 23 in the absorber-evaporator gas circuit is formed with a downward loop 35. This loop should not extend below the surface level of liquid in the absorber 13. The bottom of loop 35 is provided with a drain conduit 36 which is connected to the outer passage of the liquid heat exchanger 16. Drain conduit 36 has a coil portion 37. A gas burner 38 is arranged to heat the coil 37. The burner 38 is connected to the gas line 30. Flow of gas to burner 38 is controlled by a valve 39. A pilot 40 is provided for lighting the burner when the gas supply thereto is turned on, that is, when valve 39 is opened. The valve 39 is hand operated by a toggle lever 41. The valve 39 is also operable to its closed position by an expansible element 42 of an expansible fluid thermostat. One end of a capillary tube 43 is connected to the expansible diaphragm 42. The other end of capillary tube is connected to capillary tube 32. The capillary tube 43 could be connected to another sensitive bulb, not shown, which would also be located in thermal contact with the evaporator 12 so that the element 42 would expand responsive to increased temperature of the evaporator. This thermostat is adjustable by a screw 44. Expansion of diaphragm 42 causes valve 39 to close. The thermostat cannot cause opening of the valve. The valve 39 is opened only by manipulation of the lever 41.

Liquid stands in conduit 36 about at the same level as liquid in the lower part of absorber 13 since these parts are in communication through the outer passage of the liquid heat exchanger 16. Liquid in trap 35 drains into the upper end of conduit 36. When it is desired to melt frost on the evaporator 12, lever 41 is pushed downward, for instance, by hand. This causes valve 39 to open and the gas burner 38 to be lighted from the pilot 40. The burner heats coil 37 and causes liquid in this coil to boil. The expelled vapors rise in conduit 36 and cause liquid to rise in this conduit and into the trap 35 in conduit 23. The trap 35 fills with liquid up to the point of overflow into the absorber 13. When trap 35 is filled with liquid, gas circulation is cut off in the absorber-evaporator circuit so that the evaporator temperature rises as previously explained. When the frost has melted from evaporator 12, the temperature increases above the frost melting point. The thermostat element 42 is adjusted by screw 44 so that when the evaporator temperature rises a predetermined amount, expansion of element 42 causes valve 39 to snap shut. This turns off burner 38 and heating of coil 37 terminates. Liquid then drains out of trap 35 through conduit 36, and normal operation is resumed.

In Fig. 2 there is shown a fragmentary view showing an electric heater 45 for heating coil 37. The heater 45 is connected through a normally open switch 46 to a source of current 47. A toggle 48 is arranged to be shifted in one direction by a finger button 49 and in the other direction by expansion of thermostatic element 42. In the position shown in Fig. 2, the switch 46 is in its normally open position and toggle lever 50 is upward against stop 51.

When it is desired to melt frost in the previously described manner, the toggle 48 is shifted upward by pressure on the knob 49. When the toggle is shifted upward, the end of lever 50 snaps downward and closes switch 46 to complete the circuit of heater 45. When the evaporator temperature increases, as previously described, the thermostat element 42 expands and shifts the toggle downward so that the end of lever 50 snaps back against stop 51 and permits switch 46 to open the circuit to the heater 45.

Various changes and modifications may be made within the scope of the invention which is set forth in the following claims.

What is claimed is:

1. A refrigeration system including a circuit for gas having a place of evaporation and a place of absorption, heat operated means for controlling gas circulation in said circuit, and a device for turning said heater on and off, said device being manually operable to turn the heater on and operable to turn the heater off responsive to increase in temperature.

2. A refrigeration system including a gas circuit having an evaporator and an absorber, a liquid trap in said circuit, and means for filling said trap with liquid at will and draining liquid from said trap responsive to increase in temperature.

3. In a refrigeration system including an evaporator in which liquid refrigerant evaporates in the presence of an auxiliary agent to produce a refrigerating effect, a first place to hold liquid, structure including a second place to hold liquid, a heater to heat liquid in said second place, and a conduit connecting said first and second places, said structure being so constructed and arranged that heating of liquid in said second place by said heater causes liquid to flow therefrom to said first place to effect an increase in the partial pressure of refrigerant vapor in the evaporator to cause rise of temperature of the evaporator, and a control operable responsive to an increase in a pressure or temperature condition affected by the evaporator to shut off said heater to cause liquid to return to said second place from said first place.

4. In a refrigeration system including an evaporator in which liquid refrigerant evaporates in the presence of an auxiliary agent to produce a refrigerating effect, a first place to hold liquid, structure including a second place to hold liquid and a connection therefrom to said first place, said structure being so constructed and arranged that liquid may be caused to flow through said connection from said second place to said first place to effect an increase in the partial pressure of refrigerant vapor in the evaporator and thereby cause rise of temperature of the evaporator, and a control operable responsive to an increase in a pressure or temperature condition affected by the evaporator to cause return of liquid to said second place from said first place.

5. A refrigeration system as set forth in claim 4 in which said structure is so constructed and arranged that liquid may be raised against the force of gravity through said connection from said second place to said first place to effect an increase in the partial pressure of refrigerant vapor in the evaporator and thereby cause rise of temperature of the evaporator.

6. A refrigeration system as set forth in claim 4 in which said structure is so constructed and arranged that liquid may be raised against the force of gravity by vapor-liquid lift action from said second place to said first place to effect an increase in the partial pressure of refrigerant vapor in the evaporator and thereby cause rise of temperature of the evaporator.

7. A method of refrigeration which includes circulating auxiliary fluid, evaporating refrigerant fluid in the presence of the auxiliary fluid, flowing absorption liquid in the presence of the auxiliary fluid to remove vaporous refrigerant fluid therefrom, raising liquid by vapor-bubble action, holding the raised liquid in a manner to stop circulation of the auxiliary fluid and apart from said absorption liquid flowing in the presence of the auxiliary fluid, and lowering said raised liquid to permit resumption of circulation of the auxiliary fluid upon increase in a temperature condition affected by said evaporating refrigerant fluid.

8. A refrigeration system having a gas circuit including an evaporator and an absorber, a circuit for absorption liquid including said absorber, a liquid holder in said gas circuit which when filled with liquid stops circulation of the gas, and a liquid supplier operable to raise liquid to a level above that in said absorber to fill said holder with liquid, said supplier being operative to withdraw liquid from said holder responsive to a change in a condition in the system.

9. A refrigeration system as set forth in claim 8 in which said liquid supplier is a bubble type vapor liquid lift.

10. A refrigeration system as set forth in claim 8 in which said liquid holder is a liquid trap in the gas circuit, and said liquid supplier is a vapor liquid lift connected to receive liquid from said absorption liquid circut.

HUGO M. ULLSTRAND.